(12) United States Patent  (10) Patent No.: US 7,561,254 B2
Koide  (45) Date of Patent: Jul. 14, 2009

(54) TRAVELING SYSTEM FOR MOBILE BODIES AND CONTROL METHOD THEREFOR

(75) Inventor: Hiroyuki Koide, Inuyama (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/899,134

(22) Filed: Sep. 4, 2007

(65) Prior Publication Data

US 2008/0055103 A1    Mar. 6, 2008

(30) Foreign Application Priority Data

Sep. 5, 2006    (JP) ............................. 2006-240318

(51) Int. Cl.
*G01C 3/08*    (2006.01)
(52) U.S. Cl. .................. 356/4.01; 356/28; 356/28.5; 701/19; 701/20
(58) Field of Classification Search ....... 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 7,062,381 B1 *    6/2006    Rekow et al. ............... 701/300

2006/0071043 A1    4/2006    Taguchi et al.
2006/0276930 A1*   12/2006    Tsujimoto et al. ........... 700/214

FOREIGN PATENT DOCUMENTS

JP    200644935 A    2/2006

* cited by examiner

*Primary Examiner*—Thomas H Tarcza
*Assistant Examiner*—Luke D Ratcliffe
(74) *Attorney, Agent, or Firm*—The Webb Law Firm

(57) ABSTRACT

A traveling system for mobile bodies includes a control device for controlling traveling operation of a first and a second mobile bodies based on detection information provided by a relative distance detecting device mounted on only one of the first and second mobile bodies for detecting a distance to the other of the first and second mobile bodies, a first distance detecting device for detecting a distance between the first mobile body and a first reference position, and a second distance detecting device for detecting a distance between the second mobile body and a second reference position. The control device determines, based on distance information between the first reference position and second reference position, whether the detection information provided by each of the first and second distance detecting devices and detection information provided by the relative distance detecting device satisfy a proper determination condition, and stops movement of the first and second mobile bodies when it is determined that the proper determination condition is not satisfied.

15 Claims, 6 Drawing Sheets

TRAVELING SYSTEM FOR MOBILE BODIES AND CONTROL METHOD THEREFOR

BACKGROUND OF THE INVENTION

This invention relates to a traveling system for mobile bodies and a control method therefor. More particularly, the invention relates to a traveling system for mobile bodies and a control method therefor, having a first and a second mobile bodies for running along a travel path, a first distance detecting device for detecting a distance between a first reference position set to a first end of the travel path and the first mobile body lying adjacent the first reference position, a second distance detecting device for detecting a distance between a second reference position set to a second end of the travel path and the second mobile body lying adjacent the second reference position, and a control device for controlling traveling operations of the first and second mobile bodies, respectively, based on detection information from the first and second distance detecting devices.

The traveling system for the mobile bodies noted above is applicable to an automatic warehouse facility, for example. The control device controls traveling operations of stacker cranes or automatic transport carriages acting as an example of a pair of mobile bodies, to transport articles with the pair of mobile bodies.

The control device is configured to run each mobile body to a target traveling position based on detection information from the first distance detecting device and second distance detecting device. When one of the mobile bodies controlled to move to a target traveling position is likely to interfere with the other mobile body, the latter is shunted aside, for example. In this way, each mobile body is caused to move while avoiding a situation where the two mobile bodies are spaced away from each other by less than an allowable distance.

In a conventional example of traveling system for the above mobile bodies, in order to avoid a collision between the mobile bodies when an abnormality occurs with the control device or distance detecting devices so that traveling operations of the mobile bodies are not controlled appropriately, each of the first and second mobile bodies includes a relative distance detecting device for optically detecting a distance to the other mobile body, and a control device for monitoring the distance between the mobile bodies based on the detection information from the relative distance detecting device. When the control device provided on each mobile body for monitoring the distance between the mobile bodies determines that the distance between the mobile bodies is less than a predetermined allowable distance, an emergency stopping process is carried out to stop power supply to a propelling device, thereby to bring the mobile body to an emergency stop (see Japanese Unexamined Patent Publication No. 2006-044935, for example).

The apparatus disclosed in the above document allows mutual communication between the control devices provided on the mobile bodies for monitoring the distance between the mobile bodies. When the distance between the mobile bodies becomes shorter than the allowable distance, each of the control devices provided on the mobile bodies transmits stop command information to the control device on the other mobile body, to stop both of the mobile bodies moving abnormally close to each other. With such construction, even when an abnormality occurs with the relative distance detecting device of one of the mobile bodies moving abnormally close to each other, both of the first and second mobile bodies can be stopped reliably to prevent a collision between the mobile bodies.

In the apparatus disclosed in the above document, what correspond to the first distance detecting device and second distance detecting device are position detecting sensors arranged in opposite end regions of a travel path. Although not expressly stated in the above document, such position detecting sensors generally comprise optical distance sensors, such as laser ranging sensors, which detect traveling positions on the travel path of the mobile bodies by measuring distances between a reference position on the ground and the mobile bodies. A ground controller is provided on the ground to act as the control device. The ground controller is connected to the position detecting sensors through cables (or wires). The ground controller controls traveling operations of the first and second mobile bodies based on traveling position information about the mobile bodies which is detection information from the position detecting sensors.

In the above conventional traveling system for the mobile bodies, in order to avoid a collision between the mobile bodies when an abnormality occurs with the control device or distance detecting devices, each of the first and second mobile bodies needs to have the relative distance detecting device for detecting a distance to the other of the first and second mobile bodies, and the control device for monitoring the distance between the mobile bodies based on the detection information from the relative distance detecting device. Therefore, the construction of each mobile body becomes complicated and expensive, and the construction of the entire system having a pair of such mobile bodies also becomes complicated and expensive.

With the above conventional traveling system for the mobile bodies, the control devices provided on the respective mobile bodies for monitoring the distance between the mobile bodies must be constructed capable of communicating with each other, in order to stop reliably both of the first and second mobile bodies moving abnormally close to each other even when one of the relative distance detecting devices breaks down. In this regard also, the construction of each mobile body becomes complicated and expensive, and the construction of the entire system becomes complicated and expensive.

SUMMARY OF THE INVENTION

This invention has been made having regard to the state of the art noted above.

A traveling system for mobile bodies, according to this invention, comprises:

a travel path extending between a first path end and a second path end;

a first mobile body and a second mobile body having propelling drive device for moving along the travel path, the first mobile body and the second mobile body being arranged such that the first mobile body lies closer to the first path end than is the second mobile body;

a first distance detecting device for detecting a distance between the first mobile body and a first reference position associated with the first path end of the travel path;

a second distance detecting device for detecting a distance between the second mobile body and a second reference position associated with the second path end of the travel path;

a relative distance detecting device mounted on only one of the first and second mobile bodies for detecting a distance to the other of the first and second mobile bodies; and a control device for controlling traveling operation of each of the first and second mobile bodies based on detection information provided by the first and second distance detecting device;

wherein the control device is configured to determine, based on distance information between the first reference position and the second reference position, whether the detection information provided by each of the first and second distance detecting device and detection information provided by the relative distance detecting device satisfy a proper determination condition, and stop movement of the first and second mobile bodies when it is determined that the proper determination condition is not satisfied.

With this system, the control device determines, based on distance information between the first reference position and the second reference position, whether the detection information provided by each of the first and second distance detecting device and detection information provided by the relative distance detecting device satisfy a proper determination condition. Thus, whether all the detection information of the first and second distance detecting device and the relative distance detecting device is normal can be determined by setting in advance, as the proper determination condition, that a relationship between the distance between the first and second reference positions, the detection information of each of the first and second distance detecting device and the detection information of the relative distance detecting device is established when the detection information of all of the first and second distance detecting device and the relative distance detecting device is normal.

The control device, when having determined that the proper determination condition is not satisfied, stops movement of the first and second mobile bodies. Thus, the first and second mobile bodies are stopped when the detection information of either one of the first second distance detecting device is abnormal. Based on the detection information of the distance detecting device showing abnormality, the traveling operation of the first and second mobile bodies is controlled to avoid a collision between the mobile bodies.

In addition, since the relative distance detecting device is provided only for one of the first and second mobile bodies, the other mobile body can have a simple construction with no relative distance detecting device. This results in a simplified construction of the entire system.

Thus, this invention realizes a traveling system for mobile bodies having a simple construction for avoiding a collision of the mobile bodies.

DETAILED DESCRIPTION OF THE PREFERRED EMBODIMENTS

An embodiment of traveling system for mobile bodies as applied to a vertical storage facility will be described by way of example with reference to the drawings.

Figure 1:
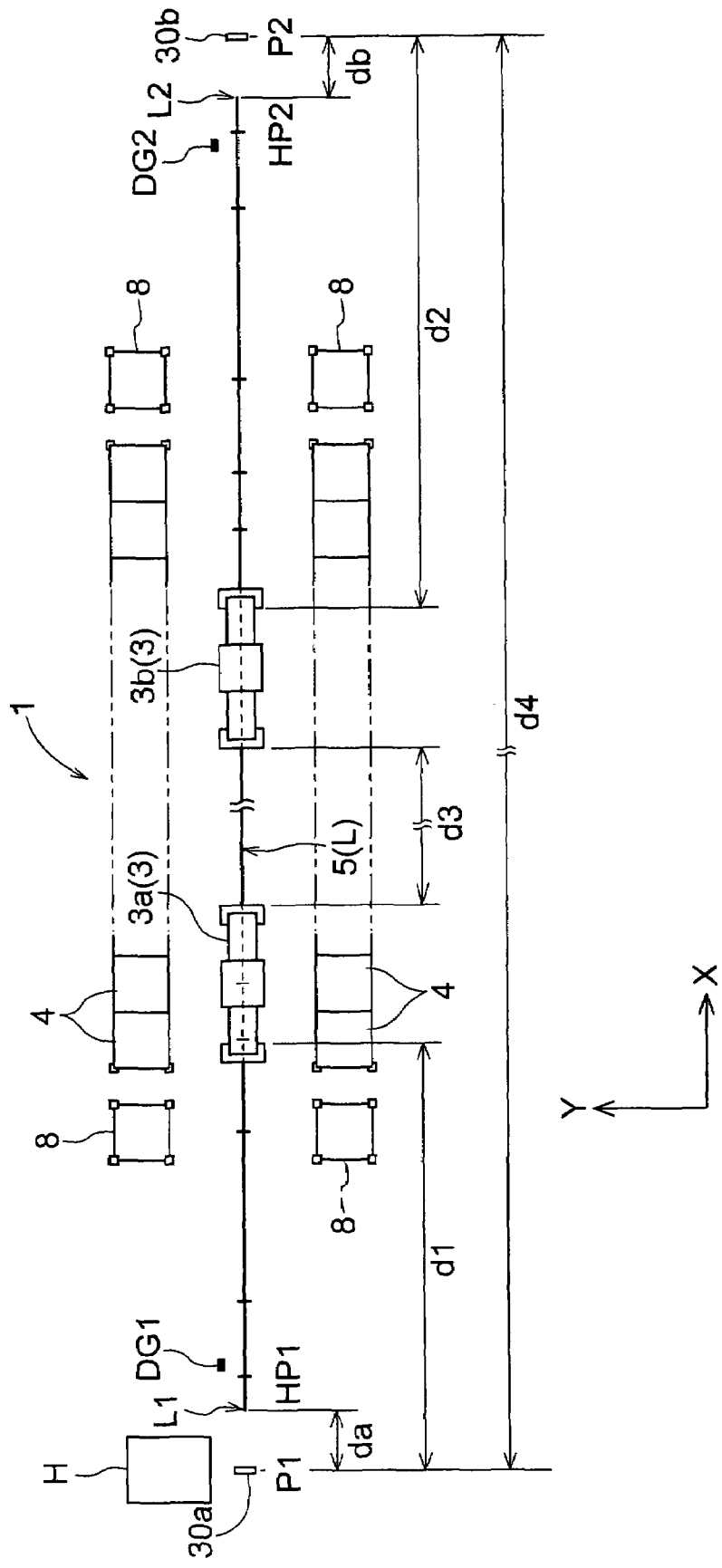
FIG. 1 is a plan view of a traveling system for mobile bodies.
Figure 2:
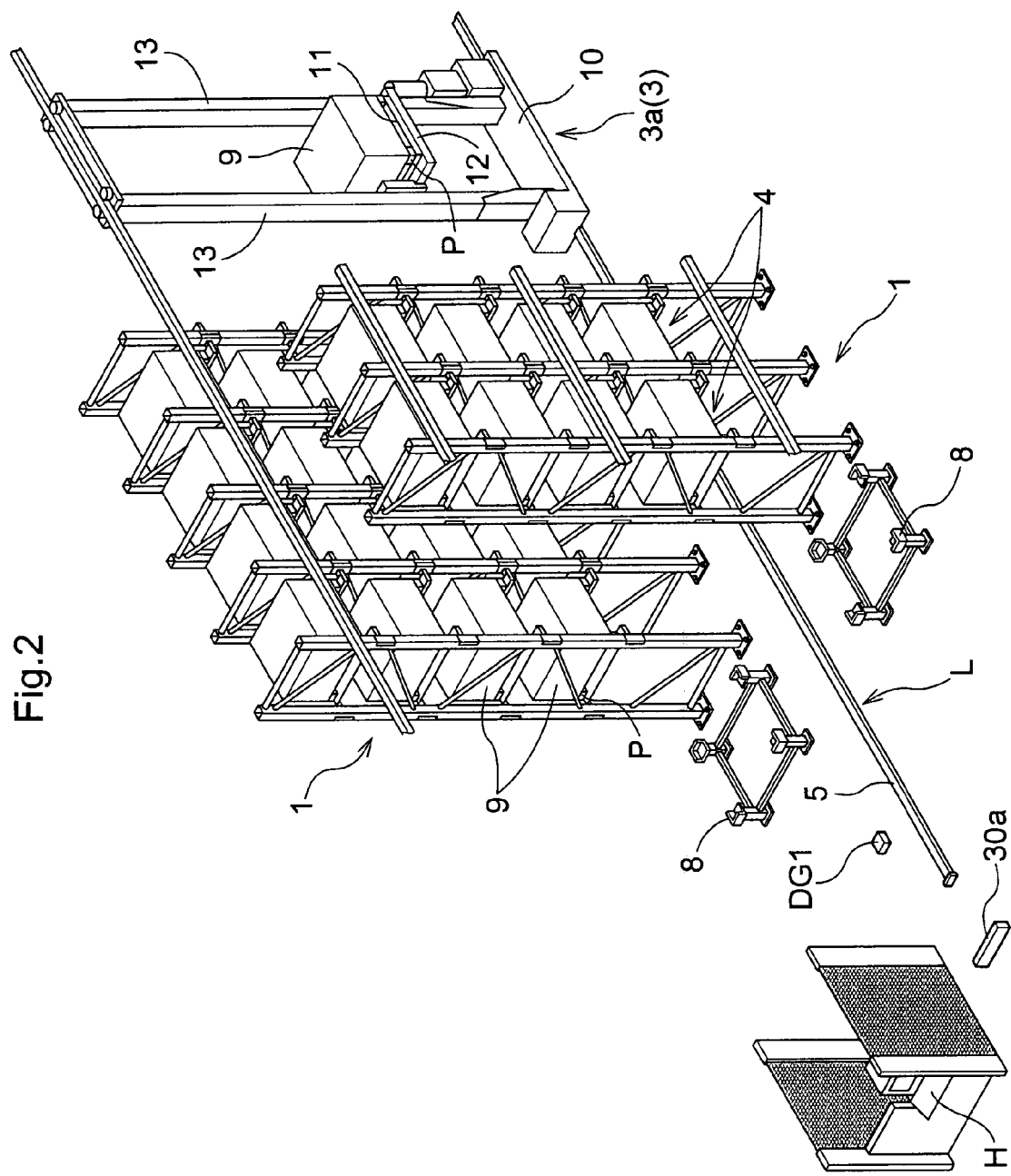
FIG. 2 is a schematic perspective view of a portion of the traveling system for mobile bodies.

As shown in FIGS. 1 and 2, the vertical storage facility includes a first storage rack 1 and a second storage rack 1 installed as spaced apart in a fore and aft direction (fore and aft direction Y shown in FIG. 1), with opposed openings for receiving and delivering articles in storage, and two stacker cranes 3 acting as a first mobile body 3a and a second mobile body 3b. Each storage rack 1 has numerous article storage units 4 arranged vertically and horizontally (in the horizontal direction X in FIG. 1). Each storage rack 1 has a first rack end and a second rack end. A path L having a first path end L1 and a second path end L2 extends along the horizontal direction between the two storage racks 1. Preferably, the path L extends linearly. The first mobile body 3a is closer to the first path end L1 than is the second mobile body 3b. That is, the second mobile body 3b is closer to the second path end L2 than is the first mobile body 3a. Preferably, the path L is formed of a rail 5 laid on the floor. A load support table 8 (article loading and unloading unit) is disposed adjacent each of the first rack end and second rack end of the first storage rack. Likewise, a load support table 8 (article loading and unloading unit) is disposed adjacent each of the first rack end and second rack end of the second storage rack. That is, a plurality of load support tables 8 are arranged in regions of opposite ends of each storage rack 1, and across the rail 5.

Each of the first mobile body 3a and second mobile body 3b includes a carriage 10 for traveling along the rail 5, lift masts 13 erected on the carriage 10, and a lift deck 12 vertically movable along the lift masts 13. The lift deck 12 may be moved through wire by an electric motor (not shown) supported on the carriage 10, or may be driven by a motor supported on the lift deck 12 through gears engaged with the lift masts 13, for example. The lift deck 12 has a fork device 11 for transferring palettes P with articles 9 placed thereon. The fork device 11 is well known in the art, and has a pair of support arms movable by an electric motor and a chain along the fore and aft direction (i.e. the direction Y shown in FIG. 1).

By combination of traveling of the carriage 10, vertical movement of the lift deck 12, and projection and retraction of the fork device 11 (i.e. movement in the fore and aft direction of the support arms), each of the first mobile body 3a and second mobile body 3b can carry out a depositing process to transport an article 9 as placed on the palette P from one of the load support tables 8 to, and store the palette P in, one of the article storage units 4, and a delivering process to transport an article 9 as placed on the palette P from one of the article storage units 4 to, and place the article 9 to, and place the article 9 on, one of the load support tables 8.

Figure 3:
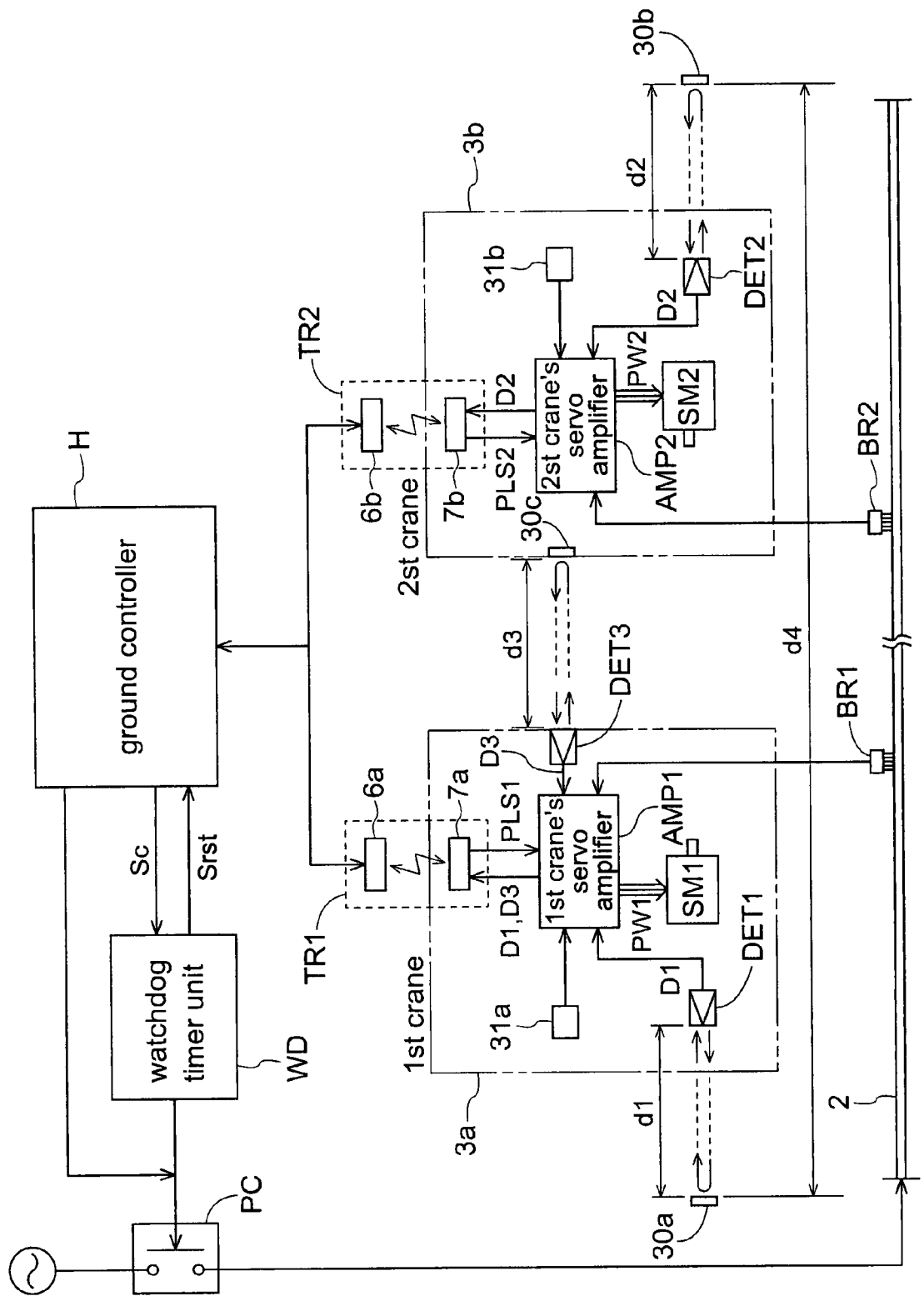
FIG. 3 is a control block diagram.

Control of the equipment will be described with reference to FIG. 3. FIG. 3 shows a control structure relating to traveling control, and does not show a structure relating to control of vertical movement of the lift deck 12 or control of projection and retraction of the fork device 11 which are not directly related to this invention.

The ground controller H acting as control device installed on the ground is connected to the first mobile body 3a to be capable of communication therewith through an optical communication device TR1 supported by the first mobile body 3a, and to the second mobile body 3b to be capable of communication therewith through an optical communication device TR2 supported by the second mobile body 3b. The control device used here can be a conventional control device having a CPU, memory, a communication circuit, and software stored in the memory as required to perform an algorithm having a coded form of the steps described in this specification. The control device itself belongs to the prior art, and is therefore not described in detail herein.

The optical communication device TR1 of the first mobile body 3a connects the ground controller H and first mobile body 3a to be capable of communication through infrared communication between a ground head unit 6a disposed in the region of first path end L1 and a carriage head unit 7a disposed on the carriage 10 of the first mobile body 3a. The ground controller H and a servo amplifier AMP1 of the first mobile body 3a communicate at predetermined communication intervals (e.g. 0.5 [ms]) to transmit and receive periodically detection information D1 provided by a laser range finder DET1 of the first mobile body 3a described hereinafter, and a driving command PLS1 of the first mobile body 3a as target driving speed information. The laser range finder described in this specification belongs to the prior art, and includes a laser emitter and a laser receiver. The laser emitted from the laser emitter is reflected by a reflector plate disposed in a target position for distance measurement, and is detected by the laser receiver.

The optical communication device TR2 of the second mobile body 3b connects the ground controller H and second mobile body 3b to be capable of communication through infrared communication between a ground head unit 6b disposed in the region of second path end L2 and a carriage head unit 7b disposed on the carriage 10 of the second mobile body 3b. The ground controller H and a servo amplifier AMP2 of the second mobile body 3b communicate at predetermined communication intervals (e.g. 0.5 [ms]) to transmit and receive periodically detection information D2 provided by a laser range finder DET2 of the second mobile body 3b described hereinafter, and a driving command PLS2 of the second mobile body 3b as target driving speed information.

In this way, the optical communication device TR1 of the first mobile body 3a and the optical communication device TR2 of the second mobile body 3b provide communication between the ground controller H and first mobile body 3a and second mobile body 3b. Thus, the optical communication device TR1 of the first mobile body 3a and the optical communication device TR2 of the second mobile body 3b constitute the communication means of this invention. The detection information D1 provided by the laser range finder DET1 of the first mobile body 31 and the detection information D2 provided by the laser range finder DET2 of the second mobile body 3b are transmitted from the first mobile body 3a and second mobile body 3b to the ground controller H constantly and periodically during operation the system.

The first mobile body 3a will be described next. The first mobile body 3a has, mounted thereon, a servomotor SM1 for driving a drive wheel provided for the carriage 10, the servo amplifier AMP1 for receiving the driving command PLS1 for the first mobile body 3a from the ground controller H, and outputting drive electric power PW1 to the servomotor SM1 based on the driving command PLS1 received, the laser range finder DET1 for optically detecting a distance d1 between the first mobile body 3a and a reflector plate 30a for the first mobile body, and an inter-vehicular range finder DET3 acting as a relative distance detecting device for detecting a distance d3 to the second mobile body 3b. Any known sensor such as an acoustic, radar, or other electromagnetic wave sensing device, may be used as a relative distance detecting device or means.

As shown in FIG. 1, the laser range finder DET1 of the first mobile body 3a detects the distance d1 between the reflector plate 30a for the first mobile body installed in a first reference position P1 spaced by an installation distance da in the direction along the travel path from the first path end L1 which is one side of travel path L, and the first mobile body 3a which is the stacker crane 3 adjacent the first reference position P1. Thus, the laser range finder DET1 acts as the first distance detecting means of this invention. That is, the first reference position P1 is set as corresponding to the first path end L1.

The laser range finder DET1 of the first mobile body 3a detects the distance d1 to the reflector plate 30a for the first mobile body by emitting range-finding light toward the reflector plate 30a for the first mobile body and receiving the light reflected by the reflector plate 30a, and outputs detection information D1. That is, the laser range finder DET1 of the first mobile body 3a is configured to detect optically the distance d1 between the first reference position P1 and first mobile body 3a.

The inter-vehicular range finder DET3 provided for the first mobile body 3a is configured to detect optically a distance to an inter-vehicular range finding reflector plate 30c mounted on the second mobile body 3b by emitting range-finding light toward the reflector plate 30c and receiving the light reflected by the reflector plate 30c, and outputs detection information D3.

The servo amplifier AMP1 of the first mobile body 3a drives the servomotor SM1 to propel the first mobile body 3a based on the driving command PLS1 for the first mobile body 3a received from the ground controller H. Thus, the servo amplifier AMP1 of the first mobile body 3a and the servomotor SM1 of the first mobile body 3a constitute the propelling means of the present embodiment. While it is preferable that the propelling means includes an electric motor and a power source, the motor does not have to be a servomotor and the propelling means does not have to have a servo amplifier. The propelling means may include a CPU, memory, a communication device, an algorithm for control purposes.

The servo amplifier AMP1 of the first mobile body 3a has the laser range finder DET1 and inter-vehicular range finder DET3 of the first mobile body 3a connected thereto by cables (or wires). Detection information D1 of the laser range finder DET1 and detection information D3 of the inter-vehicular range finder DET3 are transmitted to the ground controller H by the optical communication device TR1 of the first mobile body 3a at predetermined communication intervals (e.g. 0.5 [ms]).

The first mobile body 3a has a dog sensor 31a attached to a lower position on a side surface adjacent a longitudinally middle position of the carriage 10 of the first mobile body 3a. The dog sensor 31a of the first mobile body 3a comprises an optical sensor, which detects a dog DG1 for the first mobile body provided on the ground by a side of the travel path L when the first mobile body 3a is in a home position HP1 of the first mobile body 3a as a position of origin set to the first path end L1, and outputs detection information.

In this embodiment, traveling positions on the travel path L of the first mobile body 3a and second mobile body 3b are determined based on the longitudinally middle position of the carriage 10 of each stacker crane 3. Thus, the position of the dog DG1 for the first mobile body is adjusted so that the dog sensor 31a of the first mobile body 3a may turn on when the longitudinally middle position of the carriage 10 of the first mobile body 3a is located in the home position HP1 of the first mobile body 3a (see FIG. 1).

The second mobile body 3b will be described next. The second mobile body 3b, as does the first mobile body 3a, includes a servomotor SM2 of the second mobile body 3b and a servo amplifier AMP2 of the second mobile body 3b acting as a propelling drive device, a laser range finder DET2 of the second mobile body 3b acting as a second distance detecting means, and a dog sensor 31b of the second mobile body 3b.

The second mobile body 3b has no component corresponding to the inter-vehicular range finder DET3 of the first mobile body 3a, but has the inter-vehicular range finding reflector plate 30c. That is, only the first mobile body 3a which is one of the two stacker cranes 3 has the inter-vehicular range finder DET3 for detecting a distance d3 to the second mobile body 3b which is the other stacker crane 3.

The laser range finder DET2 of the second mobile body 3b detects a distance d2 between a reflector plate 30b for the second mobile body installed in a second reference position P2 spaced by an installation distance db in the direction along the travel path outward from the second path end L2 which is the other side of travel path L, and the second mobile body 3b which is the stacker crane 3 adjacent the second reference position P2. Thus, the laser range finder DET2 acts as the second distance detecting means of this invention. That is, the second reference position P2 is set as corresponding to the second path end L1.

The laser range finder DET2 of the second mobile body 3b detects the distance d2 to the reflector plate 30b for the second mobile body by emitting range-finding light toward the reflector plate 30b for the second mobile body and receiving the light reflected by the reflector plate 30b, and outputs detection information D2. That is, the laser range finder DET2 of the second mobile body 3b is configured to detect optically the distance d2 between the second reference position P2 and second mobile body 3b.

The constructions of servomotor SM2 of the second mobile body 3b, servo amplifier AMP2 of the second mobile body 3b, and dog sensor 31b of the second mobile body 3b are the same as those of the first mobile body 3a, and will not particularly be described.

The servo amplifier AMP2 of the second mobile body 3b has the laser range finder DET2 of the second mobile body 3b connected thereto by a cable (or wire). Detection information D2 of the laser range finder DET2 is transmitted to the ground controller H by the optical communication device TR2 of the second mobile body 3b at predetermined communication intervals (e.g. 0.5 [ms]).

Next, control operation in traveling control of the pair of stacker cranes 3 by the ground controller H will be described.

Figure 4:
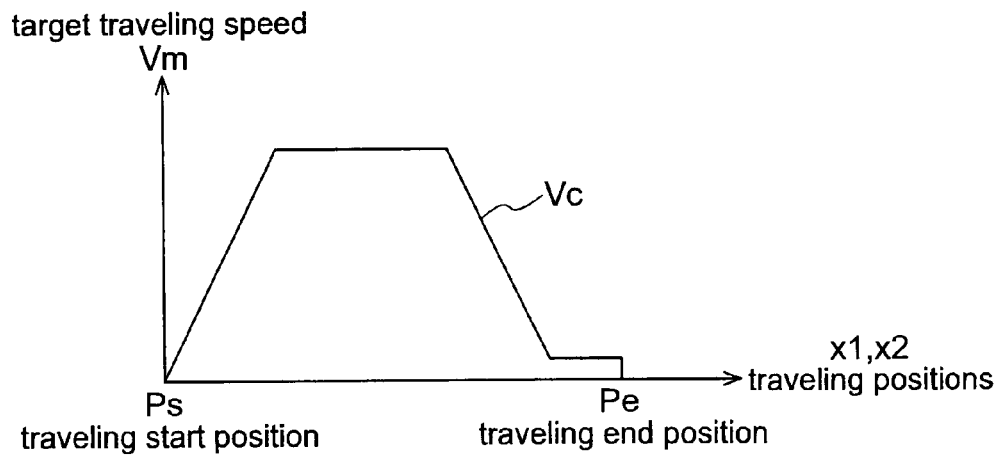
FIG. 4 shows an example of speed curve.

Upon receipt of an operation command including target traveling position information for the first mobile body 3a and second mobile body 3b, the ground controller H executes a travel control process for the stacker crane 3 designated by the operation command. Based on a traveling end position Pe and a traveling start position Ps of the stacker crane 3 under control indicated in the target traveling position information, a speed curve Vc (see FIG. 4) showing a relationship between each position in a section of the travel path from the traveling start position Ps to the traveling end position Pe which is a target traveling position and a target traveling speed Vm, by referring to a table showing the relationship. The above operation command is given by a manual input operation through an operation management control device or an operation command input device acting as a supervising control device for controlling deposition processes and delivery processes by the stacker cranes 3.

When the controlled object is the first mobile body 3a, the ground controller H transmits driving command PLS1 for the first mobile body 3a to the servo amplifier AMP1 of the first mobile body 3a at the communication intervals (e.g. 0.5 [ms]), for causing the first mobile body 3a to run from the traveling start position Ps to the traveling end position Pe at the target traveling speed Vm given by the speed curve Vc determined.

The ground controller H derives a traveling speed V1 of the first mobile body 3a from a time change rate in the detection information D1 provided by the laser range finder DET1 of the first mobile body 3a, derives target traveling speed Vm from the detection information D1 provided by the laser range finder DET1 of the first mobile body 3a and the speed curve Vc, and generates the driving command PLS1 for the first mobile body 3a based on a speed error $\Delta V1$ ($=Vm-V1$) which is a difference between the target traveling speed Vm and traveling speed V1.

The servo amplifier AMP1 of the first mobile body 3a, having received the driving command PLS1 for the first mobile body 3a, controls the drive electric power PW1 of the first mobile body 3a outputted to the servomotor SM1 of the first mobile body 3a, based on the driving command PLS1 for the first mobile body 3a, for causing the servomotor SM1 of the first mobile body 3a to operate at a rotating speed corresponding to the driving command PLS1 for the first mobile body 3a.

When the controlled object is the second mobile body 3b, the ground controller H transmits driving command PLS2 for the second mobile body 3b to the servo amplifier AMP2 of the second mobile body 3b at the communication intervals (e.g. 0.5 [ms]), for causing the second mobile body 3b to run from the traveling start position Ps to the traveling end position Pe at the target traveling speed Vm given by the speed curve Vc determined.

The ground controller H derives a traveling speed V2 of the second mobile body 3b from a time change rate in the detection information D2 provided by the laser range finder DET2 of the second mobile body 3b, derives target traveling speed Vm from the detection information D2 provided by the laser range finder DET2 of the second mobile body 3b and the speed curve Vc, and generates the driving command PLS2 for the second mobile body 3b based on a speed error $\Delta V2$ ($=Vm-V2$) which is a difference between the target traveling speed Vm and traveling speed V2.

The servo amplifier AMP2 of the second mobile body 3b, having received the driving command PLS2 for the second mobile body 3b, controls the drive electric power PW2 of the second mobile body 3b outputted to the servomotor SM2 of the second mobile body 3b, based on the driving command PLS2 for the second mobile body 3b, for causing the servomotor SM2 of the second mobile body 3b to operate at a rotating speed corresponding to the driving command PLS2 for the second mobile body 3b.

The ground controller H has a traveling position determining device, as a program (i.e. an algorithm), for determining traveling positions on the travel path L of the first mobile body 3a and second mobile body 3b based on the detection information D1 from the laser range finder DET1 of the first mobile body 3a and the detection information D2 from the laser range finder DET2 of the second mobile body 3b.

The traveling position determining device uses, as reference information, the detection information D1 provided by the laser range finder DET1 of the first mobile body 3a when the first mobile body 3a is located in the home position HP1 of the first mobile body 3a, that is when the dog sensor 31a of the first mobile body 3a detects the dog DG1 for the first mobile body, and determines a traveling position x1 on the travel path L of the first mobile body 3a based on the detection information D1 from the laser range finder DET1 of the first mobile body 3a. Similarly, the traveling position determining device uses, as reference information, the detection information D2 provided by the laser range finder DET2 of the second mobile body 3b when the second mobile body 3b is located in a home position HP2 of the second mobile body 3b, that is when the dog sensor 31b of the second mobile body 3b detects a dog DG2 for the second mobile body, and determines a traveling position x2 on the travel path L of the second mobile body 3b based on the detection information D2 from the laser range finder DET2 of the second mobile body 3b. Preferably, the dogs are obstacles such as projections arranged at or adjacent the ends of the path L to restrict movement beyond the ends of the path L of the first mobile body 3a and second mobile body 3b. Instead of such obstacles, detectable marks, recesses, indications or the like indicating the ends of the path may be used as dogs.

Figure 5:
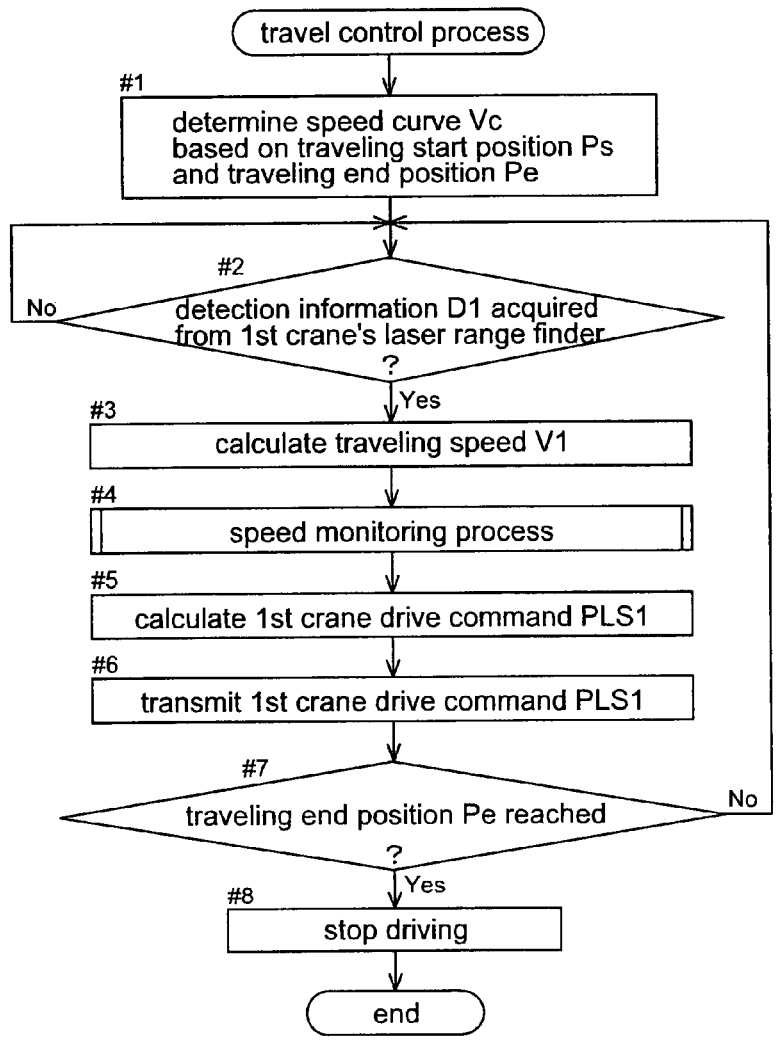
FIG. 5 is a flow chart of a traveling control process.

FIG. 5 shows a flow chart of the control operation in the travel control process performed when the first mobile body 3a is designated as controlled object. As shown in FIG. 5, the speed curve Vc is determined in step #1, based on the traveling start position Ps and traveling end position Pe.

Then, the operation is on standby until a time for communication for acquiring detection information D1 from the laser range finder DET1 of the first mobile body 3a (step #2). When detection information D1 is acquired, step #3 is executed to calculate traveling speed V1 of the first mobile body 3a is calculated based on a variation with respect to detection information D1 acquired at the previous communication time from the laser range finder DET1 of the first mobile body 3a. In Step #4, a speed monitoring process described later is performed to check whether the traveling speed V1 calculated in step #3 is within a normal range. When the speed monitoring process of step #4 terminates normally, step #5 is executed to calculate the driving command PLS1 for the first mobile body 3a as described above, which is transmitted to the first mobile body 3a in step #6.

The process from step #2 to step #6 is repeated at the communication intervals until the traveling position determining device determines from the detection information D1 provided by the laser range finder DET1 of the first mobile body 3a in step #7 that traveling position x1 of the first mobile body 3a coincides with the traveling end position Pe. Thus, the first mobile body 3a is driven from the traveling start position Ps to the traveling end position Pe at speeds according to the target traveling speed Vm shown in the speed curve Vc.

When it is found in step #7 that the first mobile body 3a has arrived at the traveling end position Pe, step #8 is executed to stop driving the servomotor SM1 of the first mobile body 3a. In order to reduce the traveling speed V1 of the first mobile body 3a to a sufficiently low speed when step #8 is executed, the target traveling speed Vm adjacent the traveling end position Pe given in the speed curve Vc is set to an appropriate value (see FIG. 4).

Thus, upon receipt of an operation command, the ground controller H performs a travel control process for each of the pair of stacker cranes 3 to determine a speed curve Vc as a target traveling speed pattern from the traveling start position Ps to the traveling end position Pe on the travel path L, and to transmit driving command PLS1 for the first mobile body 3a and driving command PLS2 for the second mobile body 3b at each communication interval to control the servo amplifier AMP1 of the first mobile body 3a, the servomotor SM1 of the first mobile body 3a, the servo amplifier AMP2 of the second mobile body 3b and the servomotor SM2 of the second mobile body 3b for causing each stacker crane 3 to travel by the speed curve Vc.

When causing a traveling operation of the stacker crane 3 acting as a controlled object, the ground controller H checks based on the position information on both of the stacker cranes 3 whether the other stacker crane 3, which is not the controlled object is obstructive to the traveling operation of the stacker crane 3 acting as the controlled object. When the other stacker crane 3 is found obstructive to the traveling operation, the ground controller H does not start transmission of the driving command PLS1 for the first mobile body 3a or the driving command PLS2 for the second mobile body 3b, whichever is the stacker crane 3 acting as the controlled object, but wait until the other stacker crane 3 moves to a traveling position with no possibility of collision. Alternatively, the ground controller H may start transmission of the driving command PLS1 for the first mobile body 3a or the driving command PLS2 for the second mobile body 3b, whichever is the other stacker crane 3, for causing the other stacker crane 3 to move away to a traveling position with no possibility of collision. In this way, travel control of each stacker crane 3 is carried out to avoid a collision between the first mobile body 3a and second mobile body 3b. Thus, as long as the system operates normally, there is no possibility of collision between the first mobile body 3a and second mobile body 3b.

Further, the ground controller H performs a measured distance data verification process and an inter-vehicular distance monitoring process as different processes to the travel control process. In addition, the speed monitoring process is performed as part of the travel control process. Thus, even if failure occurs in any part of the systems, there is the least chance of collision between the first mobile body 3a and second mobile body 3b.

To describe this aspect further, the ground controller H, in the measured distance data verification process, determines, based on reference position distance information indicating a distance d4 between the first reference position P1 at one side and the second reference position P2 at the other side, whether the detection information D1 from the laser range finder DET1 of the first mobile body 3a, the detection information D2 from the laser range finder DET2 of the second mobile body 3b and the detection information D3 from the inter-vehicular range finder DET3 satisfy a proper determination condition. When the proper determination condition is not satisfied, the ground controller H stops the first mobile body 3a and second mobile body 3b.

The ground controller H, in the inter-vehicular distance monitoring process, derives traveling speeds V1 and V2 and traveling directions DR1 and DR2 of the first mobile body 3a and second mobile body 3b, respectively, from the detection information D1 from the laser range finder DET1 of the first mobile body 3a and detection information D2 from the laser range finder DET2 of the second mobile body 3b. Based on the traveling speeds V1 and V2 and traveling directions DR1 and DR2 derived and on the detection information D3 from the inter-vehicular range finder DET3, the ground controller H determines whether the first mobile body 3a and second mobile body 3b are abnormally close to each other. When the first mobile body 3a and second mobile body 3b are found abnormally close to each other, the ground controller H stops the first mobile body 3a and second mobile body 3b.

Further, the ground controller H, in the speed monitoring process performed as part of the travel control process, derives traveling speeds V1 and V2 of the first mobile body 3a and second mobile body 3b, respectively, from the detection information D1 from the laser range finder DET1 of the first mobile body 3a and detection information D2 from the laser range finder DET2 of the second mobile body 3b. When the traveling speed V1 of the first mobile body 3a and the traveling speed V1 of the second mobile body 3b are abnormal, the ground controller H stops the first mobile body 3a and second mobile body 3b.

Figure 6:
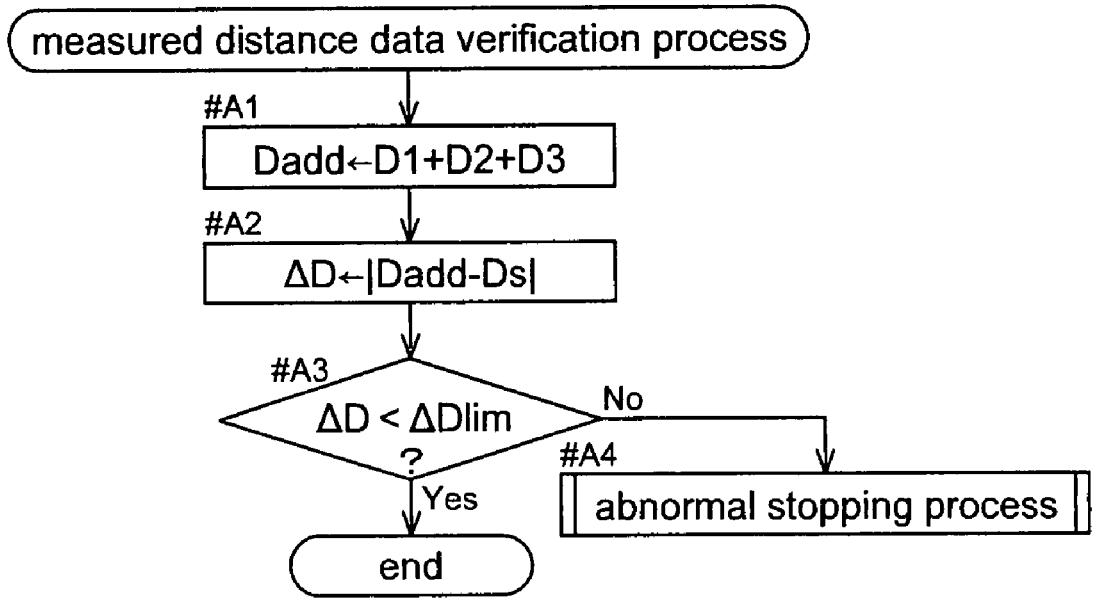
FIG. 6 is a flow chart of a measured distance data verification process.

Particulars of each of the measured distance data verification process, inter-vehicular distance monitoring process and speed monitoring process will be described hereinafter with reference to the flow charts shown in FIGS. 6 through 8.

First, the measured distance data verification process will be described with reference to the flow chart of FIG. 6. The measured distance data verification process is carried out each time the detection information D1, D2 and D3 is received from the first mobile body 3a and second mobile body 3b, that is at each communication interval (e.g. 0.5 [ms]).

In the measured distance data verification process, step #A1 is executed to add the detection information D1 from the laser range finder DET1 of the first mobile body 3a, detection information D2 from the laser range finder DET2 of the second mobile body 3b, and detection information D3 from the inter-vehicular range finder DET3 to obtain an additional value Dadd. In step #A2, an absolute value ΔD of a difference between additional value Dadd and predetermined verification value Ds is calculated. In step #A3, it is checked whether value ΔD calculated in step #A2 is smaller than a permissible error ΔDlim. When the absolute value ΔD of the difference between additional value Dadd and predetermined verification value Ds is smaller than the permissible error, all the detection information is regarded as proper and the measured distance data verification process is terminated normally. Conversely, when the absolute value ΔD is larger than permissible error ΔDlim, a failure of the distance measuring system or communication system can be considered. An abnormal stopping process is carried out in step #4 to stop running the first mobile body 3a and second mobile body 3b.

The predetermined verification value Ds is a value corresponding to an additional value of the detection information D1-D3 from the laser range finder DET1 of the first mobile body 3a, the laser range finder DET2 of the second mobile body 3b and the inter-vehicular range finder DET3 when all the laser range finder are normal. This embodiment sets, as the predetermined verification value Ds, a value obtained by detecting from the distance d4 between the reference positions an installation interval between the laser range finder DET1 and inter-vehicular range finder DET3 of the first mobile body 3a and an installation interval between the reflector plate and laser range finder DET2 of the second mobile body 3b, which installation intervals are fixed by design.

Thus, the ground controller H is configured to determine, in the measured distance data verification process, based on the distance d4 between the reference positions whether the detection information D1, D2 and D3 of the respective range finders satisfies the proper determination condition. In this embodiment, the proper determination condition is that the additional value Dadd of the detection information D1, D2 and D3 satisfies |Dadd−Ds|<Dlim.

Next, the inter-vehicular distance monitoring process will be described with reference to the flow chart of FIG. 8. The inter-vehicular distance monitoring process is performed after the above measured distance data verification process is performed and terminated normally. That is, as is the measured distance data verification process, the inter-vehicular distance monitoring process is performed at each communication interval (e.g. 0.5 [ms]).

In the inter-vehicular distance monitoring process, step #B1 is first executed to calculate traveling speed V1 and traveling direction DR1 of the first mobile body 3a are calculated based on the detection information D1 by the laser range finder DET1 of the first mobile body 3a acquired from the first mobile body 3a at the current communication time and the detection information D1 by the laser range finder DET1 of the first mobile body 3a acquired from the first mobile body 3a at the previous communication time. In step #B2, a process similar to step #1 is performed for the second mobile body 3b to calculate traveling speed V2 and traveling direction DR2 of the second mobile body 3b.

It is step #B3, braking distance α required for stopping the first mobile body 3a and braking distance β required for stopping the second mobile body 3b are calculated from the traveling speed V1 of the first mobile body 3a and the traveling speed V2 of the second mobile body 3b calculated in step #B1 and step #B2. These braking distances are calculated based on a deceleration given by the speed curve Vc in the travel control process.

In step #B4, whether the detection information D3 of the inter-vehicular range finder DET3 is changing for the decrease based on the detection information D3 by the inter-vehicular range finder DET3 acquired from the first mobile body 3a at the current communication time and the detection information D3 by the inter-vehicular range finder DET3 acquired from the first mobile body 3a at the previous communication time.

When the detection information D3 of the inter-vehicular range finder DET3 is not changing for the decrease, that is when the distance between the first mobile body 3a and second mobile body 3b is fixed or increasing, there is no possibility of collision in such a situation, and step #B4 results in "No". Then, the inter-vehicular distance monitoring process is terminated normally. On the other hand, when the detection information D3 of the inter-vehicular range finder DET3 is changing for the decrease, step #B4 results in "Yes", and step #B5 is executed to check whether the traveling direction DR1 of the first mobile body 3a and the traveling direction DR2 of the second mobile body 3b are the same or different.

If the traveling directions of the first mobile body 3a and second mobile body 3b are different, the first mobile body 3a and second mobile body 3b are traveling toward each other since the detection information D3 of the inter-vehicular range finder DET3 is changing for the decrease. Then, step #B9 is executed to determine whether the two mobile bodies have a distance therebetween greater than a sum of braking distance α of the first mobile body 3a and braking distance β of the second mobile body 3b. When the distance between the two mobile bodies is shorter than the sum of the braking distances, the two mobile bodies are determined abnormally close to each other, and an abnormal stopping process is carried out in step #B10, thereby stopping the first mobile body 3a and second mobile body 3b.

When the abnormal stopping process is performed, the first mobile body 3a and second mobile body 3b are slowed down and stopped with a greater deceleration than the deceleration in the travel control process, i.e. the deceleration given by each speed curve Vc. Thus, the no collision will occur between the first mobile body 3a and second mobile body 3b even if the abnormal stopping process is performed after the two mobile bodies are determined abnormally close to each other.

When the traveling directions of the first mobile body 3a and second mobile body 3b are the same, step #B5 results in "Yes", and the process of step #B6 is performed. That is, step #B5 results in "Yes" when the two stacker cranes 3 are moving in the same direction, and the one lying ahead in the moving direction (i.e. the stacker crane that can be hit from behind) is moving at low speed and the one lying behind (i.e. the stacker crane that can hit from behind) is moving at high speed.

In this embodiment, also when one of the stacker cranes 3 is standing still, the traveling directions are determined different in determining the traveling directions in step #B5. Thus, the process of step #B6 is performed also when one stacker crane 3 is standing still and the other stacker crane 3 is moving toward the stacker crane 3 standing still.

Step #B6 is executed to determine which of the first mobile body 3a and second mobile body 3b is running faster. This enables identification of the stacker crane 3 lying behind in the direction of movement. That is, since the traveling directions of the first mobile body 3a and second mobile body 3b are the same and the detection information D3 of the inter-vehicular range finder DET3 is changing for the decrease, the stacker crane 3 moving faster can be determined to lie behind.

In step #B7 and step #B8, when the detection information D3 of the inter-vehicular range finder DET3, i.e. the distance between the first mobile body 3a and second mobile body 3b, is less than the braking distance of the stacker crane 3 lying behind (which can hit from behind), the two mobile bodies are determined abnormally close to each other and the abnormal stopping process of step #B10 is performed. When the distance between the first mobile body 3a and second mobile body 3b is longer than the braking distance of the stacker crane 3 lying behind, the inter-vehicular distance monitoring process is terminated normally.

Next, the speed monitoring process will be described with reference to the flow chart of FIG. 7. The speed monitoring process is performed in step #4 of the travel control process (see FIG. 5). While the following description concerns the speed monitoring process in the travel control process for the first mobile body 3a, a similar speed monitoring process is performed also during the travel control process for the second mobile body 3b.

Figure 7:
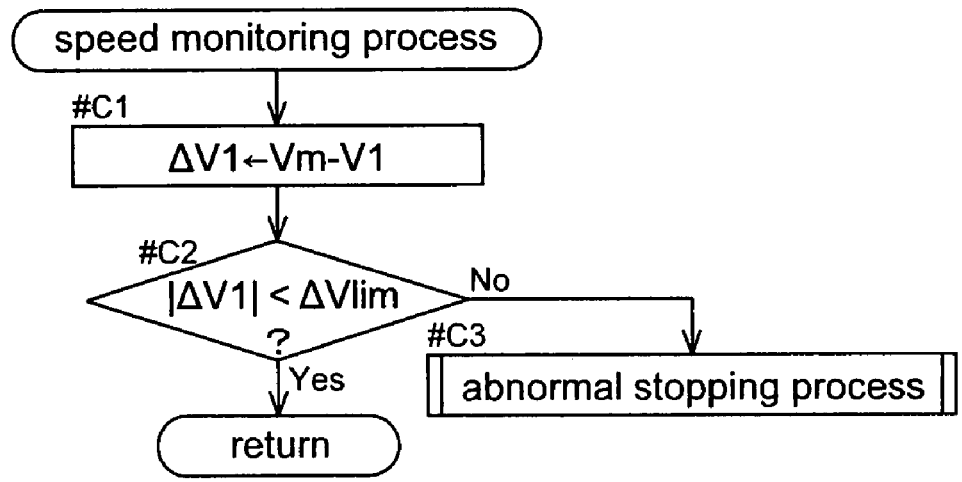
FIG. 7 is a flow chart of a speed monitoring process.
Figure 8:
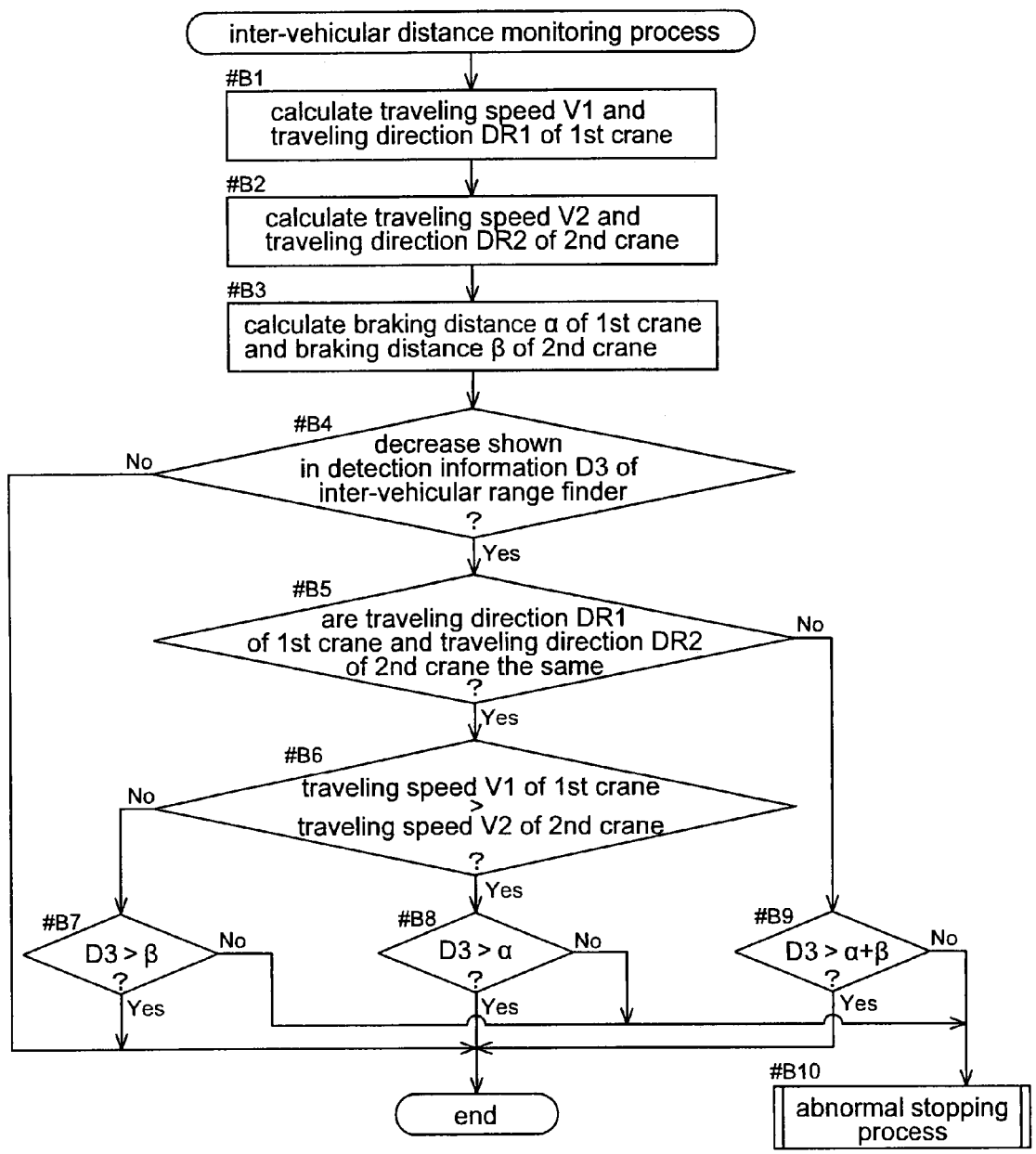
FIG. 8 is a flow chart of an inter-vehicular distance monitoring process.

As shown in FIG. 7, in step #C1 of the speed monitoring process, the target traveling speed Vm given by the speed curve Vc is first acquired based on the detection information D1 from the laser range finder DET1 of the first mobile body 3a, and a speed error $\Delta V$ of the traveling speed V1 of the first mobile body 3a is calculated.

In step #C2, whether absolute value $|\Delta V|$ of the velocity error $\Delta V$ is a value in a tolerance level is determined based on allowable limit velocity error $\Delta V$lim. When the absolute value $|\Delta V|$ of the speed error $\Delta V$ is in the tolerance level, the speed monitoring process is terminated normally. When the absolute value $|\Delta V|$ of the speed error (V is a large value in excess of the tolerance level, the current traveling speed V1 is regarded as deviating from the target traveling speed Vm to an abnormal extent. Thus, an abnormal stopping process is performed in step #C3, to stop running the first mobile body 3a and second mobile body 3b.

With the measured distance data verification process, inter-vehicular distance monitoring process and speed monitoring process described above, a collision between the first mobile body 3a and second mobile body 3b can be avoided even in an unexpected situation. Such avoidance of collision is based on the premise that the ground controller H operates normally. In order to avoid a collision between the first mobile body 3a and second mobile body 3b even when an abnormality occurs with the ground controller H itself while during traveling operation of the first mobile body 3a and second mobile body 3b, a watchdog timer unit WD is proved as a control operation monitoring device (see FIG. 3).

Specifically, the ground controller H is configured to output a normal operation checking signal Sc to the watchdog timer unit WD at each predetermined cycle, After the watchdog timer unit WD receives a normal operation checking signal Sc, a next normal operation checking signal Sc may not be received even if the predetermined cycle elapses. In such a case, the first mobile body 3a and second mobile body 3b are stopped running.

Emergency stopping operation of the first mobile body 3a and second mobile body 3b by the watchdog timer unit WD will be described. As shown in FIG. 3, a power source controller PC is provided as an electric power interrupting device switchable between a power supply state for supplying operating power to each of the first mobile body 3a and second mobile body 3b, and a power cutoff state for cutting off the operating power. The first mobile body 3a and second mobile body 3b have a contact brush BR1 and a contact brush BR2 attached to the carriages 10 thereof, respectively, which are always in contact with an electric supply rail 2 installed along the travel path L. The first mobile body 3a and second mobile body 3b, while in movement, can receive the operating power supplied to the electric supply rail 2 by the power source controller PC in the power supply state, through the contact brush BR1 of the first mobile body 3a and contact brush BR2 of the second mobile body 3b.

The watchdog timer unit WD is connected to the power source controller PC for controlling the latter. After the watchdog timer unit WD receives a normal operation checking signal Sc, a next normal operation checking signal Sc may not be received even if the predetermined cycle elapses. In such a case, the watchdog timer unit WD outputs a reset signal Srst to the ground controller H, and outputs a control command to the power source controller PC to switch the power source controller PC from the power supply state to the power cutoff state.

The ground controller H also is connected to the power source controller PC for controlling the latter, to switch the power source controller PC from the power supply state to the power cutoff state and vice versa.

When an abnormality occurs with the ground controller H, the normal operation checking signal Sc can no longer be transmitted at each predetermined cycle, and the watchdog timer unit WD stops receiving the normal operation checking signal Sc at each predetermined cycle. Then, the watchdog timer unit WD outputs the control command to the power source controller PC, whereby the power source controller PC is switched from the power supply state to the power cutoff state to stop supply of the operating power to the first mobile body 3a and second mobile body 3b. In this way, also when an abnormality occurs with the ground controller H, the first mobile body 3a and second mobile body 3b can be stopped running.

Each of the first mobile body 3a and second mobile body 3b includes a negative brake switchable to a non-braking state in response to supply of the operating power. When supply of operating power is cut off, not only the servomotor SM1 of the first mobile body 3a and the servomotor SM2 of the second mobile body 3b stop rotating, but mechanical braking by the negative brakes becomes operative. Thus, when an abnormality occurs with the ground controller H, the first mobile body 3a and second mobile body 3b in traveling operation can be stopped quickly.

As described above, in the traveling system for the mobile bodies applied to this vertical storage facility, the ground controller H performs the measured distance data verification process, inter-vehicular distance monitoring process and speed monitoring process, and its construction includes the watchdog timer unit WD. Thus, a collision between the pair of stacker cranes 3 can be avoided in an unexpected situation including an operational abnormality of the ground controller H.

Other Embodiments

Other embodiments will be described briefly hereinafter:

(1) The foregoing embodiment illustrates stacker cranes as an example of mobile bodies movable along a travel path. This is not limitative, but the mobile bodies may be automatic article transporting vehicles movable along a travel path.

(2) The foregoing embodiment illustrates the relative distance detecting device as mounted on the first mobile body 3*a*. Instead, the relative distance detecting device may be mounted on the second mobile body 3*b*.

(3) In the foregoing embodiment, the propelling means comprises the servomotor and servo amplifier. This is not limitative, but the propelling means may have a specific construction variable as appropriate, e.g. an inverter and an AC motor.

(4) In the foregoing embodiment, the distance detecting device is provided for each of the first and second mobile bodies. Instead, such distance detecting devices may be arranged on the ground.

(5) In the foregoing embodiment, the communication means performs wireless communication by infrared light. Instead, wireless communication by radio band or cable communication may be employed.

(6) In the foregoing embodiment, the distance detecting device illustrated is a laser range finder, but this is not limitative. The distance detecting device may have a varied specific construction such as those belonging to the prior art. For example, traveling positions on the travel path of each mobile body may be determined as a detecting device on the mobile body detects a plurality of components arranged on the ground along the travel path to be detected for position determination. Another example is to determine traveling positions on the travel path of each mobile body from outputs of a rotary encoder rotatable with movement of the mobile body. It is also possible to use, in place of laser, an electromagnetic wave or sound wave have other characteristics. The distance detecting device itself can be one belonging to the prior art.

(7) In the foregoing embodiment, the measured distance data verification process and inter-vehicular distance monitoring process can be carried out at each communication interval also while the travel control process is off. The mode of executing the measured distance data verification process and inter-vehicular distance monitoring process may be varied as appropriate. For example, the measured distance data verification process may be executed once for the inter-vehicular monitoring process being performed 10 times, or a mode reverse to the above. Alternatively, the measured distance data verification process and inter-vehicular distance monitoring process may be carried out only when the travel control process is in progress.

(8) In the foregoing embodiment, the control device is installed on the ground side for controlling traveling operations of the first and second mobile bodies in combination. The specific control structure of the control device may be varied as appropriate. For example, each of the first and second mobile bodies may individually include a control device for controlling traveling operation of the mobile body acting as controlled object.

(9) In place of the dogs and dog sensors, optical or other conventional sensors may be used.

What is claimed is:

1. A traveling system for mobile bodies comprising:
   a travel path extending between a first path end and a second path end;
   a first mobile body and a second mobile body each having means for propelling and each adapted to move along said travel path, said first mobile body and said second mobile body being arranged such that said first mobile body is located closer to said first path end than said second mobile body;
   first distance detecting means for detecting a distance between said first mobile body and a first reference position disposed in association with said first path end of said travel path;
   second distance detecting means for detecting a distance between said second mobile body and a second reference position disposed in association with said second path end of said travel path;
   relative distance detecting means mounted on only one of said first and second mobile bodies for detecting a distance to the other of the first and second mobile bodies; and
   control means for controlling traveling operation of each of said first and second mobile bodies based on detection information from said first and second distance detecting means;
   wherein said control means is configured to determine, based on distance information between said first reference position and said second reference position, whether a proper determination condition is satisfied which is for determining whether the detection information provided by each of said first and second distance detecting means and detection information provided by said relative first distance detecting means is information obtained when said first and second distance detecting means and said relative distance detecting means properly operate, and to stop movement of said first and second mobile bodies when it is determined that said proper determination condition is not satisfied.

2. A system as defined in claim 1, wherein said control means is configured to derive a traveling speed and a traveling direction of each of said first and second mobile bodies from the detection information provided by each of said first and second distance detecting means, determine whether said first and second mobile bodies are abnormally close to each other based on said derived traveling speeds and said traveling directions and the detection information provided by said relative distance detecting means, and to stop movement of said first and second mobile bodies when it is determined that said first and second mobile bodies are abnormally close to each other.

3. A system as defined in claim 1, wherein said control means is configured to obtain a target traveling speed pattern for each of said first and second mobile bodies from a traveling start position to a running end position on said travel path, to control said propelling means for causing the traveling operation to follow said target traveling speed pattern, to derive a traveling speed of each of said first and second mobile bodies from the detection information provided by each of said first and second distance detecting means, and to stop movement of said first and second mobile bodies when said traveling speed derived is abnormal.

4. A system as defined in claim 1, wherein:
said control means is configured to output a normal operation checking signal to means for monitoring control operation at each predetermined cycle;
said control operation monitoring means stopping movement of said first and second mobile bodies when, after receiving said normal operation checking signal, a next normal operation checking signal is not received after said predetermined cycle elapses.

5. A system as defined in claim 1, wherein:
said control means is installed on the ground; communication means is provided for communication between said control means and each of said first and second mobile bodies;
said control means is configured to transmit, through said communication means, target drive speed information indicating a target drive speed to each of said propelling means; and
each of said propelling means is operable at said target drive speed based on said target drive speed information.

6. A system as defined in claim 1, wherein said first and second distance detecting means are configured to optically detect distances between said reference positions and respective said mobile bodies.

7. A system as defined in claim 4, wherein:
said control operation monitoring means is installed on the ground; and
a power source controller is provided which is switchable between a power supply state for supplying operating power to each of the first mobile body and second mobile body and a power cutoff state for cutting off the operating power, said control operation monitoring means stopping movement of said first and second mobile bodies by transmitting a power cutoff signal to said power source controller.

8. A method of controlling a traveling system for mobile bodies, said traveling system having:
a travel path extending between a first path end and a second path end;
a first mobile body and a second mobile body each having means for propelling and each adapted to move along said travel path, said first mobile body and said second mobile body being arranged such that said first mobile body is located closer to said first path end than said second mobile body;
first distance detecting means for detecting a distance between said first mobile body and a first reference position disposed in association with said first path end of said travel path;
second distance detecting means for detecting a distance between said second mobile body and a second reference position disposed in association with said second path end of said travel path;
relative distance detecting means mounted on only one of said first and second mobile bodies for detecting a distance to the other of the first and second mobile bodies; and
control means for controlling traveling operation of each of said first and second mobile bodies based on detection information from said first and second distance detecting means;
said method comprising the steps of:
determining, based on distance information between said first reference position and said second reference position, whether a proper determination condition is satisfied which is for determining whether the detection information provided by each of said first and second distance detecting means and detection information provided by said relative distance detecting means is information obtained when said first and second distance detecting means and said relative distance detecting means properly operate; and
stopping movement of said first and second mobile bodies when it is determined that said proper determination condition is not satisfied.

9. A method as defined in claim 8, further comprising the steps of:
deriving a traveling speed and a traveling direction of each of said first and second mobile bodies from the detection information provided by each of said first and second distance detecting means;
determining whether said first and second mobile bodies are abnormally close to each other based on said derived traveling speeds and said traveling directions and the detection information provided by said relative distance detecting means; and
stopping movement of said first and second mobile bodies when it is determined that said first and second mobile bodies are abnormally close to each other.

10. A method as defined in claim 8, further comprising the steps of:
obtaining a target traveling speed pattern for each of said first and second mobile bodies from a traveling start position to a running end position on said travel path,
controlling said propelling means for causing the traveling operation to follow said target traveling speed pattern,
deriving a traveling speed of each of said first and second mobile bodies from the detection information provided by each of said first and second distance detecting means; and
stopping movement of said first and second mobile bodies when said traveling speed derived is abnormal.

11. A method as defined in claim 8, further comprising the steps of:
said control means outputting a normal operation checking signal to means for monitoring control operation at each predetermined cycle; and
said control operation monitoring means stopping movement of said first and second mobile bodies when, after receiving said normal operation checking signal, a next normal operation checking signal is not received after said predetermined cycle elapses.

12. A method as defined in claim 8, wherein:
said control means is installed on the ground;
communication means is provided for communication between said control means and each of said first and second mobile bodies;
said control means is configured to transmit, through said communication means, target drive speed information indicating a target drive speed to each of said propelling means; and
each of said propelling means is operable at said target drive speed based on said target drive speed information.

13. A method as defined in claim 8, wherein said first and second distance detecting means are configured to optically detect distances between said reference positions and respective said mobile bodies.

14. A method as defined in claim 11, wherein:
said control operation monitoring means is installed on the ground; and
a power source controller is provided which is switchable between a power supply state for supplying operating power to each of the first mobile body and second mobile body and a power cutoff state for cutting off the operating power, said control operation monitoring means stopping movement of said first and second mobile bodies by transmitting a power cutoff signal to said power source controller.

15. A traveling system for mobile bodies comprising:
a single rail extending between a first path end and a second path end;
a first vehicle and a second vehicle configured to move along said rail, said first vehicle and said second vehicle being arranged such that said first vehicle lies closer to said first path end than said second vehicle;
a first distance measuring device for detecting a distance between said first vehicle and a first reference position disposed in association with said first path end of said rail;
a second distance measuring device for detecting a distance between said second vehicle and a second reference position disposed in association with said second path end of said rail;
a controller for controlling traveling operation of each of said first and second vehicles based on detection information from said first and second distance measuring devices; and
a relative distance measuring device mounted on only one of said first and second vehicles for detecting a distance to the other of the first and second vehicles;
wherein said controller is configured to determine, based on distance information between said first reference position and said second reference position, whether the detection information provided by each of said first and second distance measuring devices and detection information provided by said relative distance measuring device satisfy a predetermined condition, and to stop movement of said first and second vehicles when it is determined that said predetermined condition is not satisfied.

* * * * *